United States Patent
Chan

(10) Patent No.: US 11,822,842 B1
(45) Date of Patent: Nov. 21, 2023

(54) HOT FOLDER FOR DRIVERLESS PRINTING

(71) Applicant: KYOCERA Document Solutions Inc., Osaka (JP)

(72) Inventor: Sam Chinh Co Tang Chan, Garden Grove, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/116,796

(22) Filed: Mar. 2, 2023

(51) Int. Cl.
*G06F 3/12* (2006.01)

(52) U.S. Cl.
CPC ........... *G06F 3/127* (2013.01); *G06F 3/1204* (2013.01); *G06F 3/1228* (2013.01)

(58) Field of Classification Search
CPC ....... G06F 3/127; G06F 3/1204; G06F 3/1228
USPC ...................................................... 358/1.15
See application file for complete search history.

(56) References Cited

U.S. PATENT DOCUMENTS

| | | | |
|---|---|---|---|
| 11,079,993 B2 | 8/2021 | Kubota | |
| 2004/0130744 A1* | 7/2004 | Wu | H04N 1/00278 358/1.15 |
| 2023/0236783 A1* | 7/2023 | Morales | G06F 3/1205 358/1.15 |

* cited by examiner

*Primary Examiner* — Allen H Nguyen
(74) *Attorney, Agent, or Firm* — W. Eric Webostad

(57) ABSTRACT

Systems and methods relate generally to driverless printing. In a method, time expired files are hidden in a hot folder. The hot folder is configured to push a print job entry for the driverless printing for the time expired files. The hiding includes: renaming a first data file name to a second data file name; marking the second data file name as processing in association with operation of the hot folder; mapping a relationship between the first data file name and the second data file name; renaming a first reference file name to a second reference file name; marking the second reference file name as processing in association with operation of the hot folder; and mapping a relationship between the first reference file name and the second reference file name. The print job entry is created for the print job and is pushed for the time expired files.

20 Claims, 8 Drawing Sheets

HOT FOLDER FOR DRIVERLESS PRINTING

FIELD

The following description relates to processing of a print job. More particularly, the following description relates to using a hot folder for driverless printing of a print job.

BACKGROUND

Generally, a "hot folder" serves as a staging area for items stored therein to be used for some purpose. A hot folder may be continuously monitored, so when files or other items are copied to, pasted to, dropped in, or otherwise put in association with such hot folder, such items are automatically processed according to a predefined layout. For example, Breeze Systems (https://www.breezesys.com/) has created a software tool ("tool") known as a "Hotfolder Prints." This tool for photographers and photobooth operators wanting to automatically lay out images and print them. The tool monitors a folder for recently added images, and when threshold quantities of images are available, the tool automatically formats from a selected predefined layout the recently added images into a page ready format from a for printing. Such page may then be automatically printed or saved as an image for later use. This tool uses various layout options for different images on a page with size and orientation variations together with a background, overlay and captions. Another example is tool known as "Hotfolder" from Mediarich (available from Equilibrium (https://equilibrium.com/hotfolder/)). This tool allows content files to be batch processed and delivered.

SUMMARY

In accordance with one or more below described examples, a method relating generally to driverless printing by a user device is disclosed. In such a method, time expired files are hidden in a hot folder accessible by a printer system. The hot folder is configured to push a print job entry for the driverless printing by the printer system for the time expired files. The hiding includes: renaming a data file of the time expired files in the hot folder from a first data file name to a second data file name different from the first data file name; marking the second data file name as processing in association with operation of the hot folder; mapping a relationship between the first data file name and the second data file name; renaming a reference file in the hot folder from a first reference file name to a second reference file name different from the first reference file name; marking the second reference file name as processing in association with operation of the hot folder; and mapping a relationship between the first reference file name and the second reference file name. The print job entry is created in the printer system. The print job entry is pushed for the time expired files.

In accordance with one or more below described examples, a system relating generally to driverless printing by a user device is disclosed. In such a system, a printer system has a memory configured to store program code; a processor coupled to the memory; and a printer engine configured for execution of printer operations. In combination and response to executing the program code, the printer system is configured to initiate operations for implementing a process for the driverless printing by the user device, the process including: hiding time expired files in a hot folder accessible by the printer system; the hot folder configured to push a print job entry for the driverless printing by the printer system for the time expired files. The hiding including: renaming a data file of the time expired files in the hot folder from a first data file name to a second data file name different from the first data file name; marking the second data file name as processing in association with operation of the hot folder; mapping a relationship between the first data file name and the second data file name; renaming a reference file in the hot folder from a first reference file name to a second reference file name different from the first reference file name; marking the second reference file name as processing in association with operation of the hot folder; and mapping a relationship between the first reference file name and the second reference file name. The process further including creating the print job entry in the printer system; and pushing the print job entry for the time expired files.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIGS. 3-1 through 3-4 are block diagrams depicting respective examples of corresponding print jobs for driverless printing using a hot folder.

FIG. 4 is a pictorial diagram depicting an example of a network.

DETAILED DESCRIPTION

Figure 1:
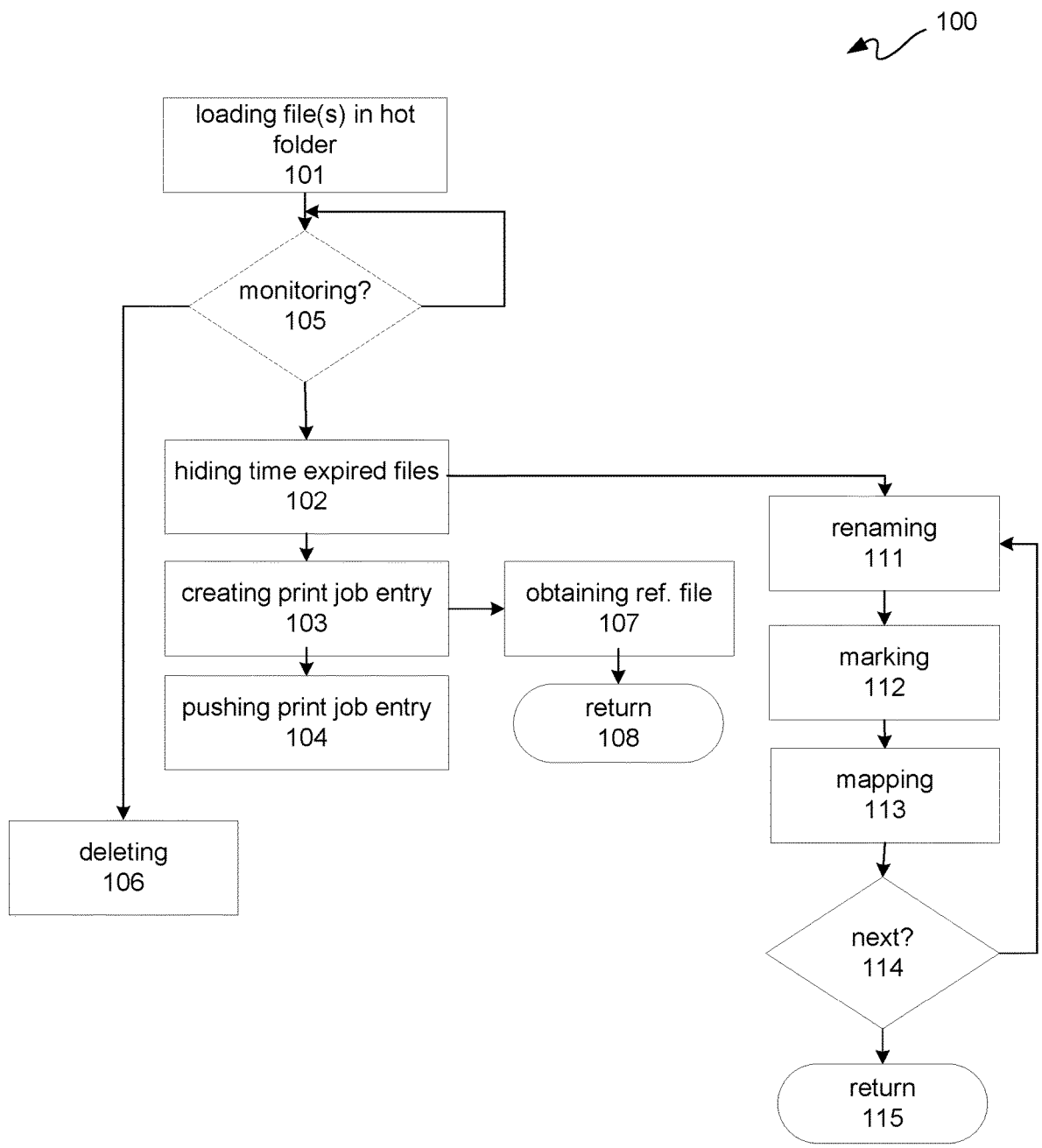
FIG. 1 is a flow diagram depicting an example of a driverless printing flow.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Before describing the examples illustratively depicted in the several figures, a general introduction is provided to further understanding.

The CIP4. Organization or CIP4.org has developed exchange message and data formats. Basically, a JDF or Job Definition Format is a process automation specification. An XJDF (Exchange Job Definition Format) assumes that a job ticket exists as an internal representation within a management application. Along those lines, an XJDF describes an interface between management applications and applications that execute instructions, namely an extensible, XML-based information interchange interface. An XJDF specifies an interchange format between two applications that are assumed to have an internal data model that is not necessarily based on XJDF. A JMF or Job Messaging Format is communication format with multi-level capabilities providing a command and control language for a JDF. An Exchange Job Messaging Format or XJMF an extensible form of a JMF.

In a conventional document handling system, a printer or printer system may only receive a print job from a normal protocol, such as for example port 9100, lpr, or ftp. Print job settings ("job settings") may be obtained from a printer driver ("driver"). In another example, job settings might not be provided from a driver. In either example, a print job output may not meet a user's desired or targeted result. Generally, it can be difficult for a user to print a print job without first setting up a printer on a user device 122. In some instances, a user device 122, such as for example a mobile device, may not be able to print a print job due to absence of a driver for a printer.

As described below in additional detail, a hot folder or hotfolder may be provided via a printer shared network folder, and this hot folder may or may not have user defined job setting. When a print job file ("job file") is copied to such a hot folder, a printer may find such a job file and print it out using job settings, as described below in additional detail.

With the above general understanding borne in mind, various configurations for systems, and methods therefor, for driverless printing are generally described.

Reference will now be made in detail to examples which are illustrated in the accompanying drawings. In the following detailed description, numerous specific details are set forth in order to provide a thorough understanding of the following described implementation examples. It should be apparent, however, to one skilled in the art, that the implementation examples described below may be practiced without all the specific details given below. Moreover, the example implementations are not intended to be exhaustive or to limit scope of this disclosure to the precise forms disclosed, and modifications and variations are possible in light of the following teachings or may be acquired from practicing one or more of the teachings hereof. The implementation examples were chosen and described in order to best explain principles and practical applications of the teachings hereof to enable others skilled in the art to utilize one or more of such teachings in various implementation examples and with various modifications as are suited to the particular use contemplated. In other instances, well-known methods, procedures, components, circuits, and/or networks have not been described in detail so as not to unnecessarily obscure the described implementation examples.

For purposes of explanation, specific nomenclature is set forth to provide a thorough understanding of the various concepts disclosed herein. However, the terminology used herein is for the purpose of describing particular examples only and is not intended to be limiting. As used herein, the singular forms "a", "an" and "the" are intended to include the plural forms as well, unless the context clearly indicates otherwise. As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. It will also be understood that the term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc., may be used herein to describe various elements, these elements should not be limited by these terms, as these terms are only used to distinguish one element from another.

Some portions of the detailed descriptions that follow are presented in terms of algorithms and symbolic representations of operations on data bits, including within a register or a memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those involving physical manipulations of physical quantities. Usually, though not necessarily, these quantities take the form of optical, electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers or memories into other data similarly represented as physical quantities within the computer system memories or registers or other such information storage, transmission or display devices.

Concepts described herein may be embodied as apparatus, method, system, or computer program product. Accordingly, one or more of such implementation examples may take the form of an entirely hardware implementation example, an entirely software implementation example (including firmware, resident software, and micro-code, among others) or an implementation example combining software and hardware, and for clarity any and all of these implementation examples may generally be referred to herein as a "circuit," "module," "system," or other suitable terms. Furthermore, such implementation examples may be of the form of a computer program product on a computer-usable storage medium having computer-usable program code in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency ("RF") or other means. For purposes of clarity by way of example and not limitation, the latter types of media are generally referred to as transitory signal bearing media, and the former types of media are generally referred to as non-transitory signal bearing media.

Computer program code for carrying out operations in accordance with concepts described herein may be written in an object-oriented programming language such as Java, Smalltalk, C++ or the like. However, the computer program code for carrying out such operations may be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network ("LAN") or a wide area network ("WAN"), or the connection may be made to an external computer (for example, through the Internet using an Internet Service Provider).

Systems and methods described herein may relate to an apparatus for performing the operations associated therewith. This apparatus may be specially constructed for the purposes identified, or it may include a general-purpose computer selectively activated or reconfigured by a computer program stored in the computer.

Notwithstanding, the algorithms and displays presented herein are not inherently related to any particular computer or other apparatus. Various general-purpose systems may be used with programs in accordance with the teachings herein, or it may prove convenient to construct a more specialized apparatus to perform the operations. In addition, even if the following description is with reference to a programming language, it should be appreciated that any of a variety of programming languages may be used to implement the teachings as described herein.

One or more examples are described below with reference to flowchart illustrations and/or block diagrams of methods, apparatus (including systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of apparatuses (including systems), methods and computer program products according to various implementation examples. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

It should be understood that although the flow charts provided herein show a specific order of operations, it is understood that the order of these operations may differ from what is depicted. Also, two or more operations may be performed concurrently or with partial concurrence. Such variation will depend on the software and hardware systems chosen and on designer choice. It is understood that all such variations are within the scope of the disclosure. Likewise, software and web implementations may be accomplished with standard programming techniques with rule-based logic and other logic to accomplish the various database searching operations, correlation operations, comparison operations and decision operations. It should also be understood that the word "component" as used herein is intended to encompass implementations using one or more lines of software code, and/or hardware implementations, and/or equipment for receiving manual inputs.

Figure 2:
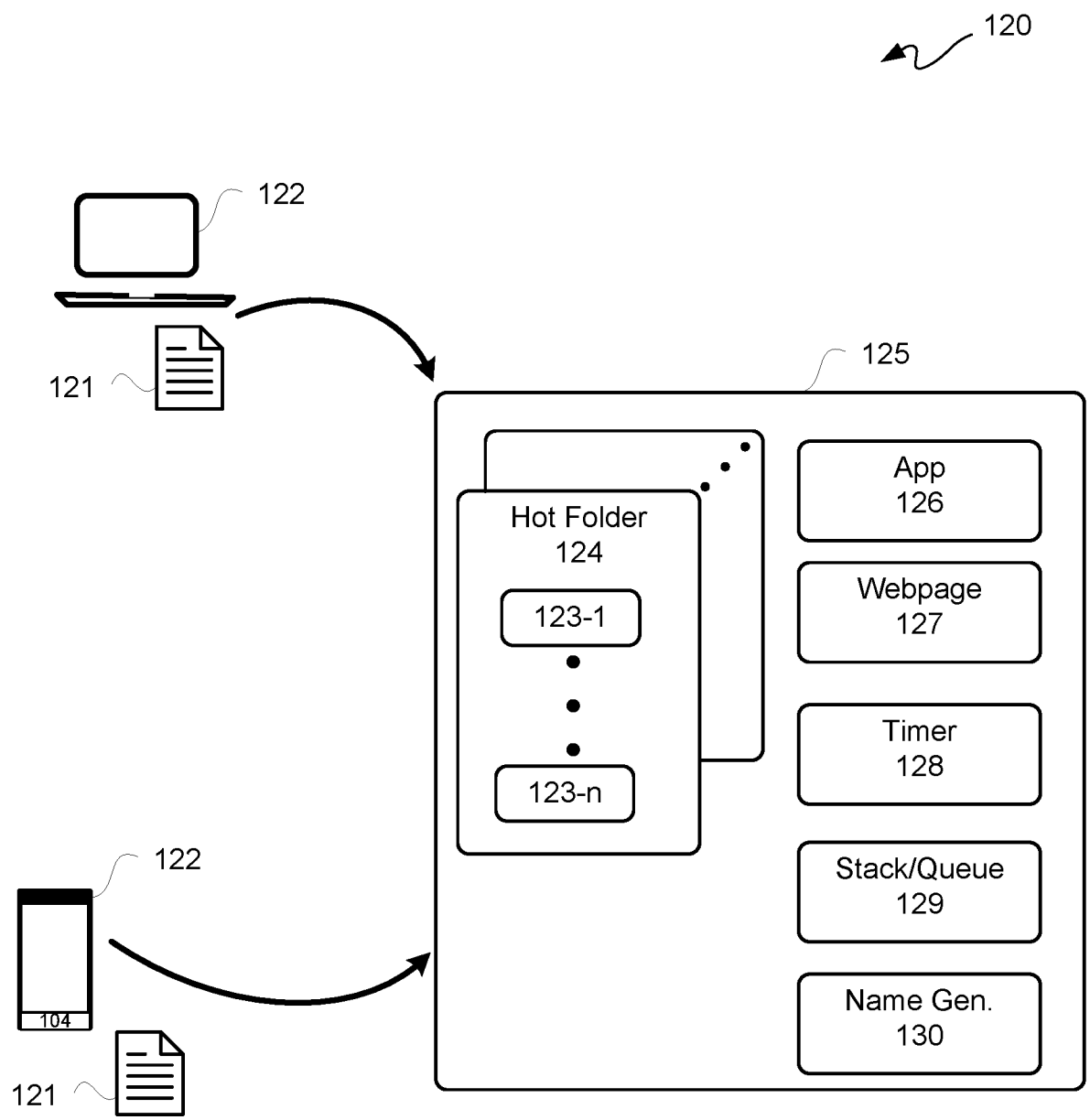
FIG. 2 is a block diagram depicting an example of a networked system for the driverless printing flow of FIG. 1.

FIG. 1 is a flow diagram depicting an example of a driverless printing flow 100. FIG. 2 is a block diagram depicting an example of a networked system 120 for driverless printing flow 100 of FIG. 1. With simultaneous reference to FIGS. 1 and 102, driverless printing flow 100 is further described.

At 101, one or more print job files 123-1 through 123-*n* (for n a positive integer greater than 1) forming a print job 121 may be provided from a user device 122 to a "hot folder" or "hotfolder" 124 of a printer system 125. A user device 122 may be a notebook computer, a desktop computer, a smart phone, a tablet, a terminal, a web/cloud computer, or other electronic device capable of providing a print job 121 to a printer system 125. Moreover, communication of a print job 121 from a user device 122 to a printer system 125 may be wired or wireless.

In response to receiving a file 123, a timer module ("timer") 128 of printer system 125 may be initiated to start timing a wait time for such a file. In this example, hot folder 124 is shared by printer system 125 and includes a defined expiration time for each of a plurality of file extensions. Additional details regarding operation of a hot folder 124 are provided below.

Printer system 125 may continuously monitor hot folder 124 for addition of one or more files, such as for example one or more data files or one or more of each of data and reference files. Optionally, continuous monitoring at 105 by printer system 125 of hot folder 124 may additionally be for expiration of files. In an example, timer 128 signals expiration of time on a set of printer job files in a hot folder 124 without monitoring, as in a "watchdog timer." For example, a timer 128 may be started on a data file and an associated reference file for a defined expiration time for an extension of each such file. For example, a data file may have a pdf extension, and a reference file may be an XML file.

Optionally at 105 monitoring for unsupported files loaded into a hot folder 124 may be performed while waiting for a file or files to expire. Each unsupported file may be marked and sent for subsequent deletion at operation 106. Each supported file may be passed onto operation 102 for processing.

Optionally at 105, while waiting for a file or files to expire, monitoring may be to analyze such one or more files. For example, a PDF file may be analyzed by printer system 125 to determine how many pages are in such file during a waiting interval prior to reaching a defined expiration time for a data or reference file.

At 102, time expired files 123 are hidden in such a hot folder 124 accessible by a printer system 125 from a user. In this example, hot folder 124 is resident in memory or other storage of a printer system 125; however, in another example a hot folder 124 may be in memory or a storage device external with respect to printer system 125 but accessible by such system.

Generally, a hot folder is a folder that may serve as a staging area for some purpose. A hot folder may be continuously monitored, and one or more files pasted, copied or dropped into a hot folder may be automatically processed. However, for a shared hot folder 124, a wait time may be used to delay automatic processing.

A hot folder 124 may generally be thought of as a print folder with user defined or default print job settings associated therewith. In this example, a hot folder 124 is a network shared folder that a printer system 125 shared to allow viewing, such as by a user via a user device 122, and to allow one or more files, such as one or more job files 123 of a print job 121, to be copied via a user device 122 to such hot folder 124. Using a hot folder 124 as described herein, a user device 122 does not need to include a printer driver for printer system 125 for user device driverless printing.

However, a hot folder 124 need not be a network shared folder, as for example a direct connection between a user device 122 and a printer system 125 may be used. Moreover, a portable storage device, such as for example a USB flash drive, may be used for porting files from a user device 122 to a printer system 125. In another example, a webpage or a configuration app may be used rather than a shared network folder, as described below in additional detail.

For purposes of clarity by way of example and not limitation, an XJMF extended job messaging format, an XJDF extended job format, and a PDF portable document format are used. However, one or more of these formats may be changed in other examples. For example, Mixed Object: Document Content Architecture or Open XML Paper Specification may be used for a portable document format.

In this example, printer system 125 is coupled to or part of a network. For purposes of clarity by way of example and not limitation, printer system 125 may be configured to use a Samba protocol ("Samba"), where folders can be share via such protocol. Again, in another example, a different file or folder sharing protocol may be used, such as for example a Server Message Block protocol or a Web Distributed Authoring and Versioning protocol.

A printer system 125 may have a configuration application ("app") 126 or a webpage 127 so a user device 122 may be used to create/add and configure a shared folder, such as hot folder 124, as well as add files to such shared folder. In an example, a user device 122 in communication with a hot folder 124 to load a print job 121 thereto, does not need to include a printer driver for printer system 125 for user device driverless printing.

Along those lines, a hot folder 124 may have a selection of printer job settings which are user accessible and configurable via app 126 or webpage 127. A hot folder 124 may be configured by a manufacturer to include default printer job setting. These printer job settings may be used for one or more printing preferences, such as color, page size, staples, and hole punch, among others.

Each hot folder 124 in printer system 125 may have a defined file expiration time for each type of file extension. An expiration time is a time printer system 125 waits after a file is pasted/dropped into a hot folder 124 before such file is process by printer system 125.

For a shared hot folder, printer system 125 may be configured to monitor hot folder 124 for each incoming pasted/dropped file to/in hot folder 124. Along those lines, responsive to a user via a user device 122 pasting/dropping in a file in a hot folder 124, printer system 125 may be configured to immediately starting to monitor or time such file. For example, when files are discovered by printer system 125 in a hot folder 124, printer system 125 may start a timer 128, such as for XJMF, XJDF, or PDF files. Printer system 125 may monitor or track a file until it is finished being copied in a hot folder 124, and after finishing, printer system 125 may notify a timer 128 to start timing such a file's presence in a hot folder 124.

Returning to 102, time expired files 123 in a hot folder 124 as flagged by time 128 reaching a predetermined expiration time may be hidden to prevent a user from accessing same so a printer system 125 via a hot folder 124 may start automatically processing such files.

Hiding at operation 102 may include operations 111 through 115. At operation 111, a data file 123-1 of time expired files of a print job 121 may be renamed in hot folder 124. Such a data file may be renamed from a first data file name to a second data file name different from such first data file name. For example, such a file name may be a random or pseudo-random set of characters or a hash of a set of characters, so as not likely to be a name used by a user, or more generally not likely to present any conflict with any other named file in a hot folder 124.

At 112, such a second data file name may be marked, such as by hot folder 124, as processing in association with operation of hot folder 124. This marking further indicates that such file is not a newly added file to hot folder 124, but rather is a file currently be processed in accordance with functioning of hot folder 124.

At 113, a relationship between such a first data file name and second data file name may be mapped for maintaining such a relationship. For example, a table or other mapping or indexing may be used for correlation of first and second file names. Accordingly, once a print job file is processed under a second file name, such a print job may have printed out a first file name, possibly along with a user's name, to indicate to a user which file was printed by them.

A data file may for example have a PDF extension; however, a print job may include more than one data file and further may include at least one reference file. So before triggering automatic processing, a hot folder 124 may wait until all files of a print job have expired before hiding them at operation 102. For example, responsive to a data file and a reference file of a print job becoming the time expired files, hiding at 102 may be initiated.

At 114 a check for a next file in a print job may be made. If there is another file in a print job, then such another file is obtained at 114 and renamed, marked, and mapped as previously described for operations 111 through 113, respectively.

Each of a plurality of extensions, which may include formats covering at least XJMF, XJDF, and PDF, may be processed for a set of files for a print job. For example, first reference file with a first reference file name in a hot folder 124 may be renamed to a second reference file name at operation 111, different from any other names including such first reference file name in such hot folder 124.

Such a second data file name and a second reference file name may be respective generated names by printer system 125 by a name generator module 130. Such a second reference file name may be marked or flagged as processing at operation 112 in association with operation of hot folder 124. Such a second reference file name may be mapped to a first reference file name therefor at operation 113. Such mapping may be to print out printer settings in association with such print job.

If there are no other files of a print job to be processed as determined at operation 114, then at 115 driverless printing flow 100 may return to operation 102 for subsequent processing.

At 103, responsive to receipt of a print job 121 in a hot folder 124, printer system 125 monitoring such hot folder may create a print job entry in a printer stack or queue 129 for such a print job in such system. Such print job entry may be created while printer system 125 is waiting for a timed wait period to expire for such print job 121.

In an example, a data file with a random file name, namely an expired data file having been renamed, may be moved to an internal jdf processor (a Job Definition Format (XML-based job ticket format) processor) and renamed back to its original file name for such job ticket.

At operation 103, a reference file may be obtained at operation 107 to create a print job entry. After obtaining such a reference file at 107, then at 108 driverless printing flow 100 may return to operation 103 for subsequent processing.

In an example, a data file and a reference file may be kept in a hot folder 124 and such reference file may be processed on the fly ("live") or in real time. Because both data and reference files have been given unique names, such as for example by different unique random numbers, a user may not know such filename exists in such hot folder. Accordingly, for a user to change a file by overwriting is not likely to occur before expiration of a wait time.

Optionally, a check sum file, such as a check_sum(md5) for example, may be used to verify a file has not been changed. Optionally, a backup/zip hot folder with files may be made in a temporary location for recovery purposes, such as if a file is corrupted or overwritten. Optionally, a file attribute may be set to read-only to prevent overwriting.

At 104, a hot folder 124 may push a print job entry created at 103 for driverless printing by a printer system 125. A hot folder 124 may be configured to automatically push a print job entry for driverless printing responsive to expiration of a wait time, namely responsive to each time expired file. At this stage, a push to print may be with final print job, such as for example an XJDF file+PDF file+any other data file(s).

Again, different extensions may have same or different predefined wait times. Generally, a reference file has a shorter wait time than a data file, and so this ensures a processing order of reference file(s) before data file(s). Furthermore, even though a single hot folder 124 has been described for purposes of clarity, there may be multiple hot folders 124 from which print job entries are created in stack/queue 129 for multiple print jobs 121 from multiple users. Thus, each user device 122 may be assigned a separate hot folder 124.

However, each renamed file persists in a same hot folder 124, namely not moved to another folder. Such marked files need not trigger a change of file name in a low level file event, because such files contain the same information as their respective original counterparts.

Figures 1, 3:
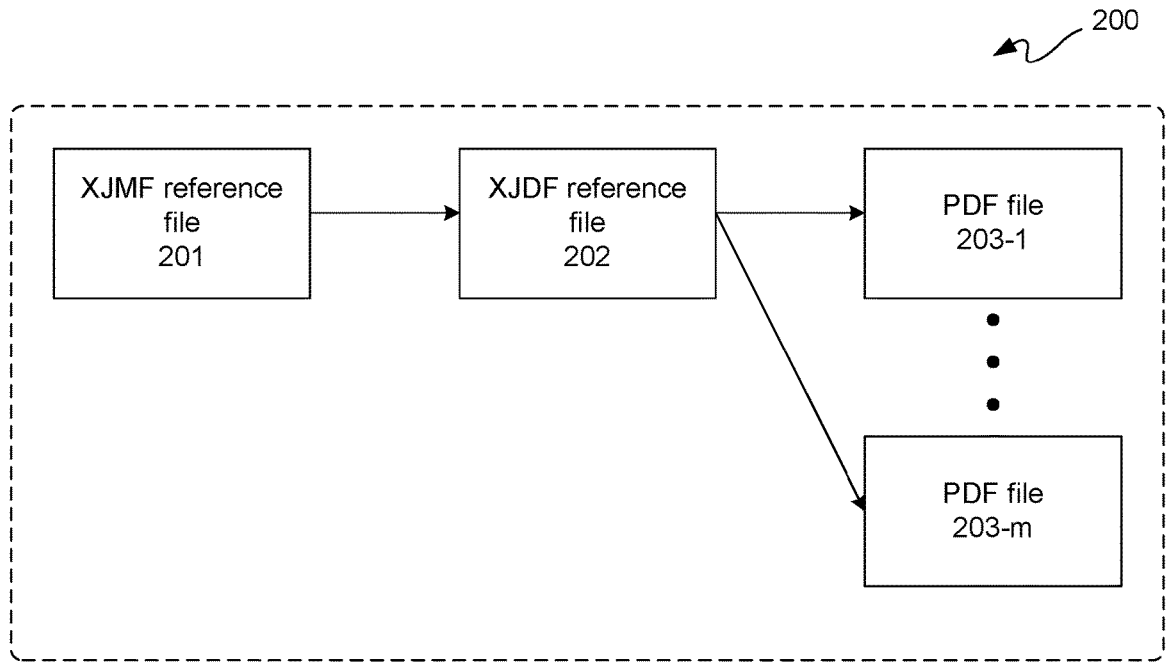
Figures 2, 3:
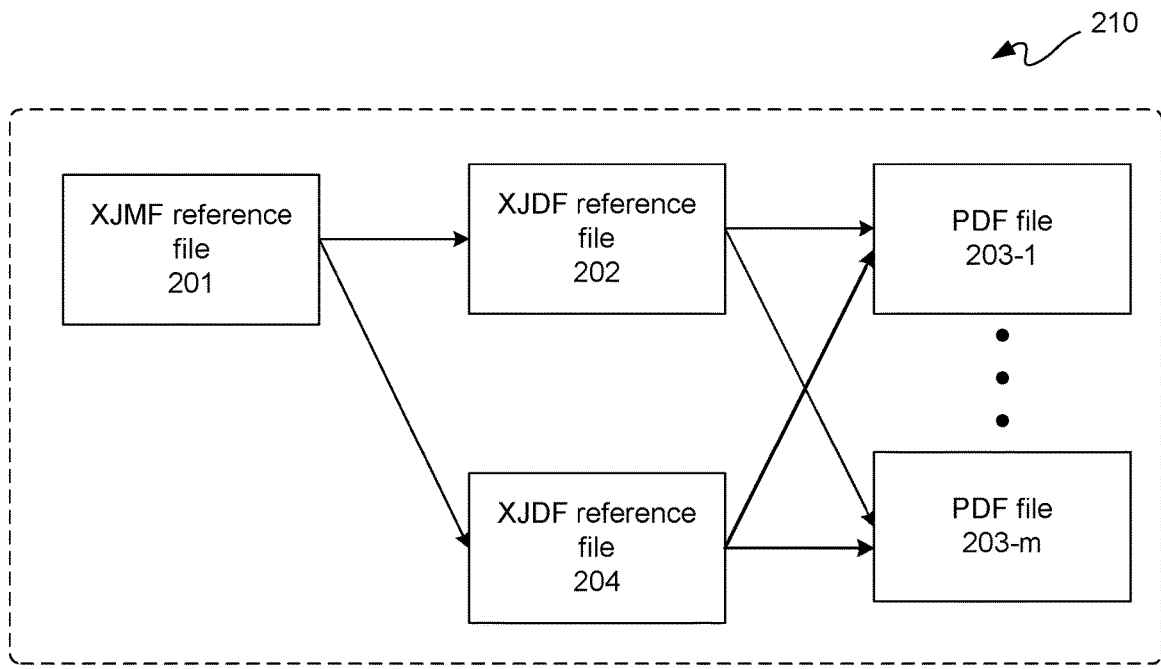
Figure 3:
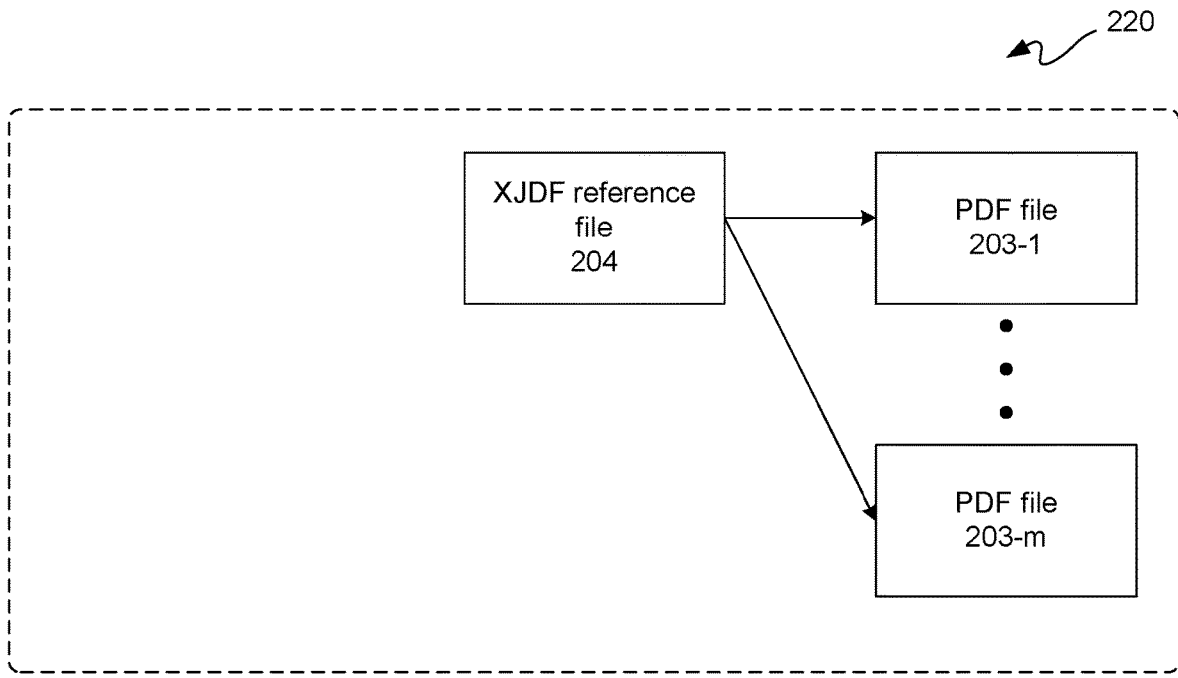

FIG. 3-1 is a block diagram depicting an example of a print job 200 for driverless printing using a hot folder, as previously described. Print job 200 is further described with simultaneous reference to FIGS. 1 through 3-1.

In this example, print job 200 includes an XJMF reference file 201, an XJDF reference file 202, and one or more PDF files 203-1 through 203-*m* for m a positive integer greater than one. In this example, an XJMF file 201 is used to make a print job entry. Though in this example a data file is a PDF file, other types of files may be used such as for example a PS (PostScript) file, PCL (Printer Command Language) file, or any other type of file that a printer system can process as a print job file.

In this example, XJMF reference file 201 references XJDF reference file 202, and XJDF reference file 202 references each of PDF files 203-1 through 203-*m* ("PDF file 203"). Each of print job 200 files may be renamed in a hot folder 124 for hiding, as previously described.

In an example, XJDF file 202 may be a default XJDF file resident in hot folder 124. Such a default XJDF file may include default print job settings. In this example, a default XJMF file 201 may be obtained at 107 to create a print job entry referencing XJDF file 202.

In another example, XJDF file 202 may be generated by printer system 125 to provide job settings for PDF file 203.

Again, a default XJMF file 201 may be obtained at 107 to create a print job entry referencing XJDF file 202.

In another example, XJDF file 202 may be generated with user-selected settings to provide job settings for PDF file 203. An XJMF file 201 referencing XJDF file 202 may be obtained or generated to create a print job entry referencing XJDF file 202. In this example, an XJDF reference file includes user-selected job settings for driverless printing of a print job by a printer system.

FIG. 3-2 is a block diagram depicting an example of a print job 210 for driverless printing using a hot folder, as previously described. Print job 210 is further described with simultaneous reference to FIGS. 1, 2, and 3-2.

In this example, print job 210 includes an XJMF reference file 201, an XJDF reference file 202, a default XJDF reference file 204, and one or more PDF files 203-1 through 203-m for m a positive integer greater than one.

In this example, XJMF reference file 201 references XJDF reference files 202 and 204, and both of XJDF reference files 202 and 204 references PDF file 203. Each of print job 210 files may be renamed in a hot folder 124 for hiding, as previously described; however, a default XJDF reference file 204 may already have a unique reserved name or other protection against overwriting.

In this example, XJDF reference files 202 and 204 respectively are a user selected job settings file and a default job settings file for print job 210. XJDF reference file 204 may be resident in hot folder 124 to supplement XJDF file 202 with default job settings for a print job 210. In this example, XJMF file 202 may be a default XJMF file generated by printer system 125 for creating a print job entry referencing XJDF files 202 and 204. In this as well as example, more than one reference file may include job settings for driverless printing of a print job by a printer system.

FIG. 3-3 is a block diagram depicting an example of a print job 220 for driverless printing using a hot folder, as previously described. Print job 220 is further described with simultaneous reference to FIGS. 1, 2, and 3-3.

In this example, print job 210 includes a default XJDF reference file 204 and a PDF file 203. XJDF reference file 204 references each PDF file 203.

If a data file, such as PDF file 203 has expired in a hot folder 124, then a default XJDF reference file 204 resident in such hot folder may be used to create a print job entry, such as at operation 107, and provide print job settings. In this as well as other examples, a single reference file may include default job settings for driverless printing of a print job by a printer system.

Figures 3, 4:
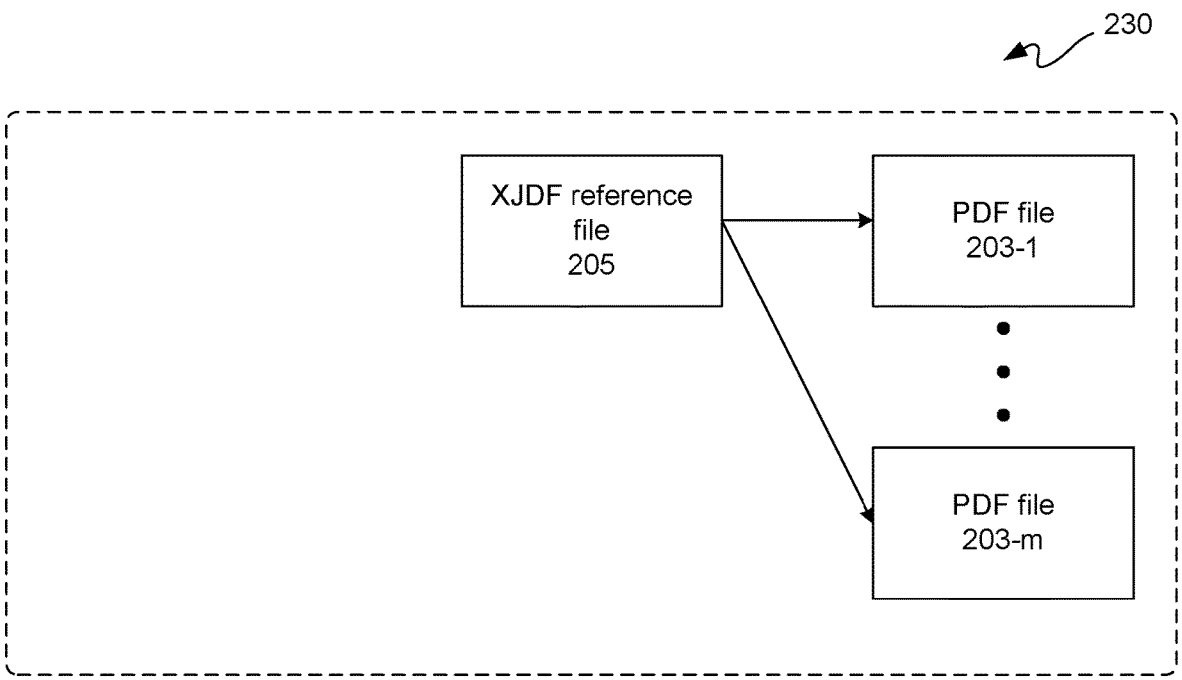
Figure 4:
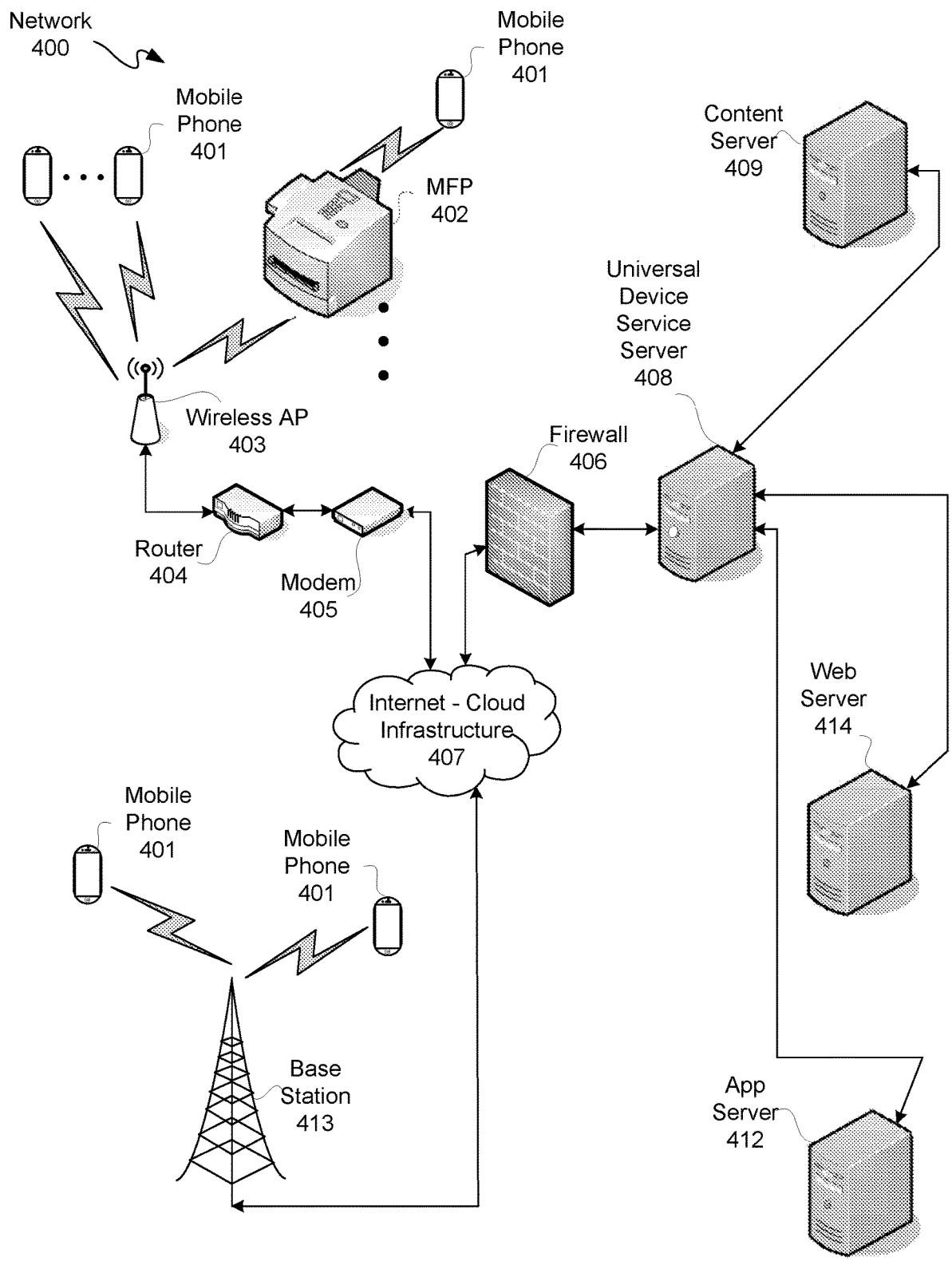

FIG. 3-4 is a block diagram depicting an example of a print job 230 for driverless printing using a hot folder, as previously described. Print job 230 is further described with simultaneous reference to FIGS. 1, 2, and 3-4.

In this example, print job 210 includes a printer system 125 generated XJDF reference file 205 and a PDF file 203. XJDF reference file 205 references each PDF file 203.

If a data file, such as PDF file 203 has expired in a hot folder 124 and there is no default XJDF reference file 204 resident in such hot folder, printer system 125 may generate an XJDF reference file 205 which may be used to create a print job entry, such as at operation 107, and provide print job settings.

To briefly summarize FIGS. 3-1 through 3-4, to process files, an XJMF file may be used to make a print job entry; an XJMF file may reference an XJDF file; and such an XJDF file, as well as a default hot folder XJDF file (if present in such hot folder), may be used to make/provide print job settings. An XJMF file may reference a PDF and all related print resources, such as ICC and others. Furthermore, a reference file, such as an XJMF file, may use one or more unexpired or yet to expired files, such as for example an XJDF file and a PDF file where neither have yet to expire. A default XJMF file may be used to create a print job entry, and an expired/unexpired XJDF file, as well as a default hot folder XJDF file (if present in such hot folder), may be used to make/provide print job settings. If only a PDF has expired, a default XJMF file may be used to create a print job entry and to make/provide print job settings, if such default XJDF file exists in an associated hot folder; otherwise, an XJMF file may be printer system generated to make/provide print job setting.

Because one or more of the examples described herein may be implemented using an information processing system, a detailed description of examples of each of a network (such as for a Cloud-based SaaS implementation), a computing system, a mobile device, and an MFP is provided. However, it should be understood that other configurations of one or more of these examples may benefit from the technology described herein.

FIG. 4 is a pictorial diagram depicting an example of a network 400, which may be used to provide a SaaS platform for hosting a service or micro service for use by a user device, as described herein. Along those lines, network 400 may include one or more mobile phones, pads/tablets, notebooks, and/or other web-usable devices 401 in wired and/or wireless communication with a wired and/or wireless access point ("AP") 403 connected to or of a wireless router. Furthermore, one or more of such web-usable wireless devices 401 may be in wireless communication with a base station 413.

Additionally, a desktop computer and/or a printing device, such as for example one or more multi-function printer ("MFPs") 402, each of which may be web-usable devices, may be in wireless and/or wired communication to and from router 404. An MFP 402 may include at least one plasma head as previously described herein.

Wireless AP 403 may be connected for communication with a router 404, which in turn may be connected to a modem 405. Modem 405 and base station 413 may be in communication with an Internet-Cloud infrastructure 407, which may include public and/or private networks.

A firewall 406 may be in communication with such an Internet-Cloud infrastructure 407. Firewall 406 may be in communication with a universal device service server 408. Universal device service server 408 may be in communication with a content server 409, a web server 414, and/or an app server 412. App server 412, as well as a network 400, may be used for downloading an app or one or more components thereof for accessing and using a service or a micro service as described herein.

Figure 5:
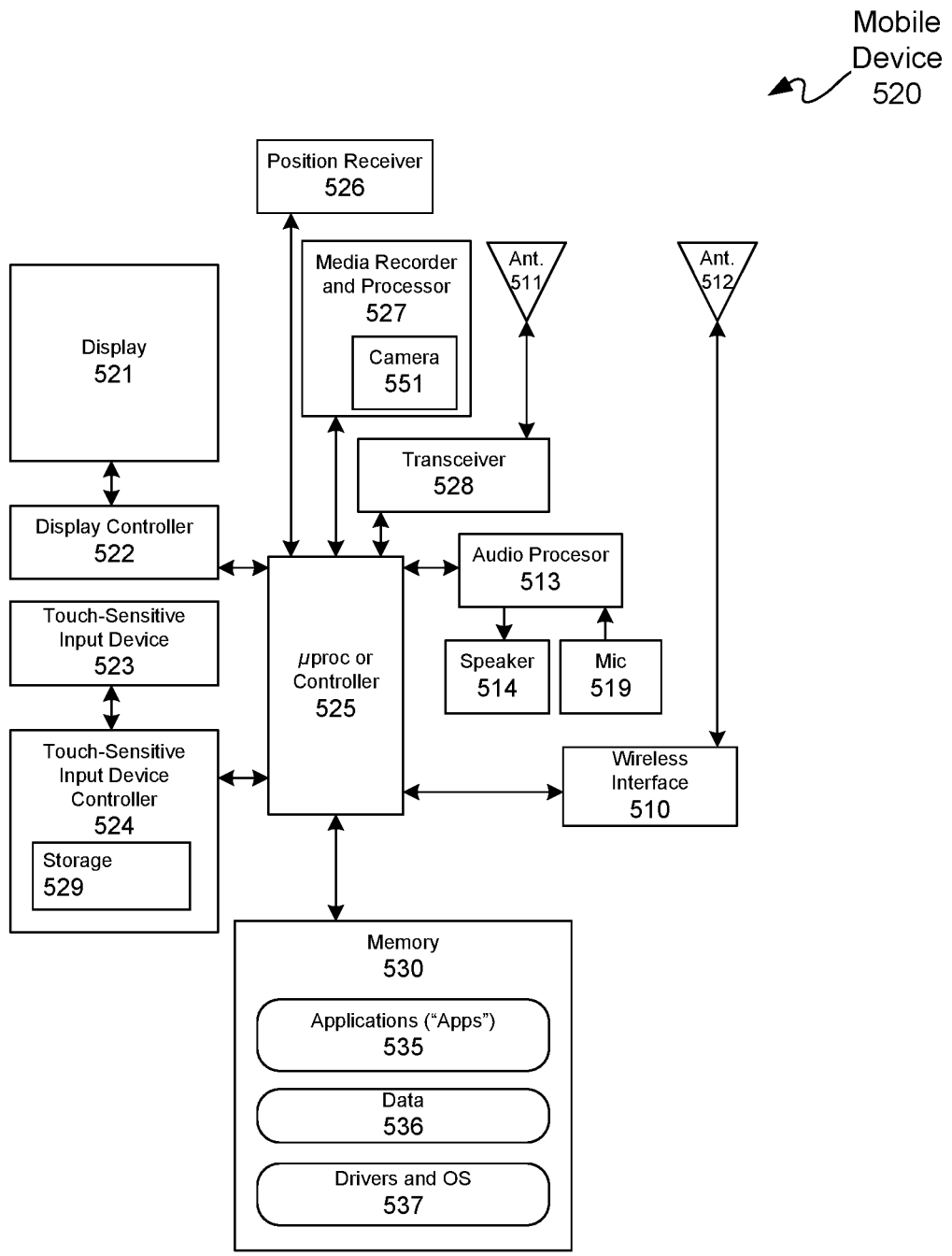
FIG. 5 is a block diagram depicting an example of a portable communication device.

FIG. 5 is a block diagram depicting an example of a portable communication device ("mobile device") 520. Mobile device 520 may be an example of a mobile device used to instruct a printing device.

Mobile device 520 may include a wireless interface 510, an antenna 511, an antenna 512, an audio processor 513, a speaker 514, and a microphone ("mic") 519, a display 521, a display controller 522, a touch-sensitive input device 523, a touch-sensitive input device controller 524, a microprocessor or microcontroller 525, a position receiver 526, a media recorder 527, a cell transceiver 528, and a memory or memories ("memory") 530.

Microprocessor or microcontroller 525 may be programmed to control overall operation of mobile device 520.

Microprocessor or microcontroller 525 may include a commercially available or custom microprocessor or microcontroller.

Memory 530 may be interconnected for communication with microprocessor or microcontroller 525 for storing programs and data used by mobile device 520. Memory 530 generally represents an overall hierarchy of memory devices containing software and data used to implement functions of mobile device 520. Data and programs or apps, such as a mobile client application as described hereinabove, may be stored in memory 530.

Memory 530 may include, for example, RAM or other volatile solid-state memory, flash or other non-volatile solid-state memory, a magnetic storage medium such as a hard disk drive, a removable storage media, or other suitable storage means. In addition to handling voice communications, mobile device 520 may be configured to transmit, receive and process data, such as Web data communicated to and from a Web server, text messages (also known as short message service or SMS), electronic mail messages, multimedia messages (also known as MMS), image files, video files, audio files, ring tones, streaming audio, streaming video, data feeds (e.g., podcasts), and so forth.

In this example, memory 530 stores drivers, such as I/O device drivers, and operating system programs ("OS") 537. Memory 530 stores application programs ("apps") 535 and data 536. Data may include application program data. Apps 535 may include an XJDF reference file for a hot folder for communicating to a printer system in place of a printer driver.

I/O device drivers may include software routines accessed through microprocessor or microcontroller 525 or by an OS stored in memory 530. Apps, to communicate with devices such as the touch-sensitive input device 523 and keys and other user interface objects adaptively displayed on a display 521, may use one or more of such drivers.

Mobile device 520, such as a mobile or cell phone, includes a display 521. Display 521 may be operatively coupled to and controlled by a display controller 522, which may be a suitable microcontroller or microprocessor programmed with a driver for operating display 521.

Touch-sensitive input device 523 may be operatively coupled to and controlled by a touch-sensitive input device controller 524, which may be a suitable microcontroller or microprocessor. Along those lines, touching activity input via touch-sensitive input device 523 may be communicated to touch-sensitive input device controller 524. Touch-sensitive input device controller 524 may optionally include local storage 529.

Touch-sensitive input device controller 524 may be programmed with a driver or application program interface ("API") for apps 535. An app may be associated with a service, as previously described herein, for use of a SaaS. One or more aspects of above-described apps may operate in a foreground or background mode.

Microprocessor or microcontroller 525 may be programmed to interface directly touch-sensitive input device 523 or through touch-sensitive input device controller 524. Microprocessor or microcontroller 525 may be programmed or otherwise configured to interface with one or more other interface device(s) of mobile device 520. Microprocessor or microcontroller 525 may be interconnected for interfacing with a transmitter/receiver ("transceiver") 528, audio processing circuitry, such as an audio processor 513, and a position receiver 526, such as a global positioning system ("GPS") receiver. An antenna 511 may be coupled to transceiver 528 for bi-directional communication, such as cellular and/or satellite communication.

Mobile device 520 may include a media recorder and processor 527, such as a still camera 551, a video camera, an audio recorder, or the like, to capture digital pictures, audio and/or video. Microprocessor or microcontroller 525 may be interconnected for interfacing with media recorder and processor 527. Image, audio and/or video files corresponding to the pictures, songs and/or video may be stored in memory 530 as data 536.

Mobile device 520 may include an audio processor 513 for processing audio signals, such as for example audio information transmitted by and received from transceiver 528. Microprocessor or microcontroller 525 may be interconnected for interfacing with audio processor 513. Coupled to audio processor 513 may be one or more speakers 514 and one or more microphones 519, for projecting and receiving sound, including without limitation recording sound, via mobile device 520. Audio data may be passed to audio processor 513 for playback. Audio data may include, for example, audio data from an audio file stored in memory 530 as data 536 and retrieved by microprocessor or microcontroller 525. Audio processor 513 may include buffers, decoders, amplifiers and the like.

Mobile device 520 may include one or more local wireless interfaces 510, such as a WIFI interface, an infrared transceiver, and/or an RF adapter. Wireless interface 510 may provide a Bluetooth adapter, a WLAN adapter, an Ultra-Wideband ("UWB") adapter, and/or the like. Wireless interface 510 may be interconnected to an antenna 512 for communication. As is known, a wireless interface 510 may be used with an accessory, such as for example a hands-free adapter and/or a headset. For example, audible output sound corresponding to audio data may be transferred from mobile device 520 to an adapter, another mobile radio terminal, a computer, or another electronic device. In another example, wireless interface 510 may be for communication within a cellular network or another Wireless Wide-Area Network (WWAN).

Figure 6:
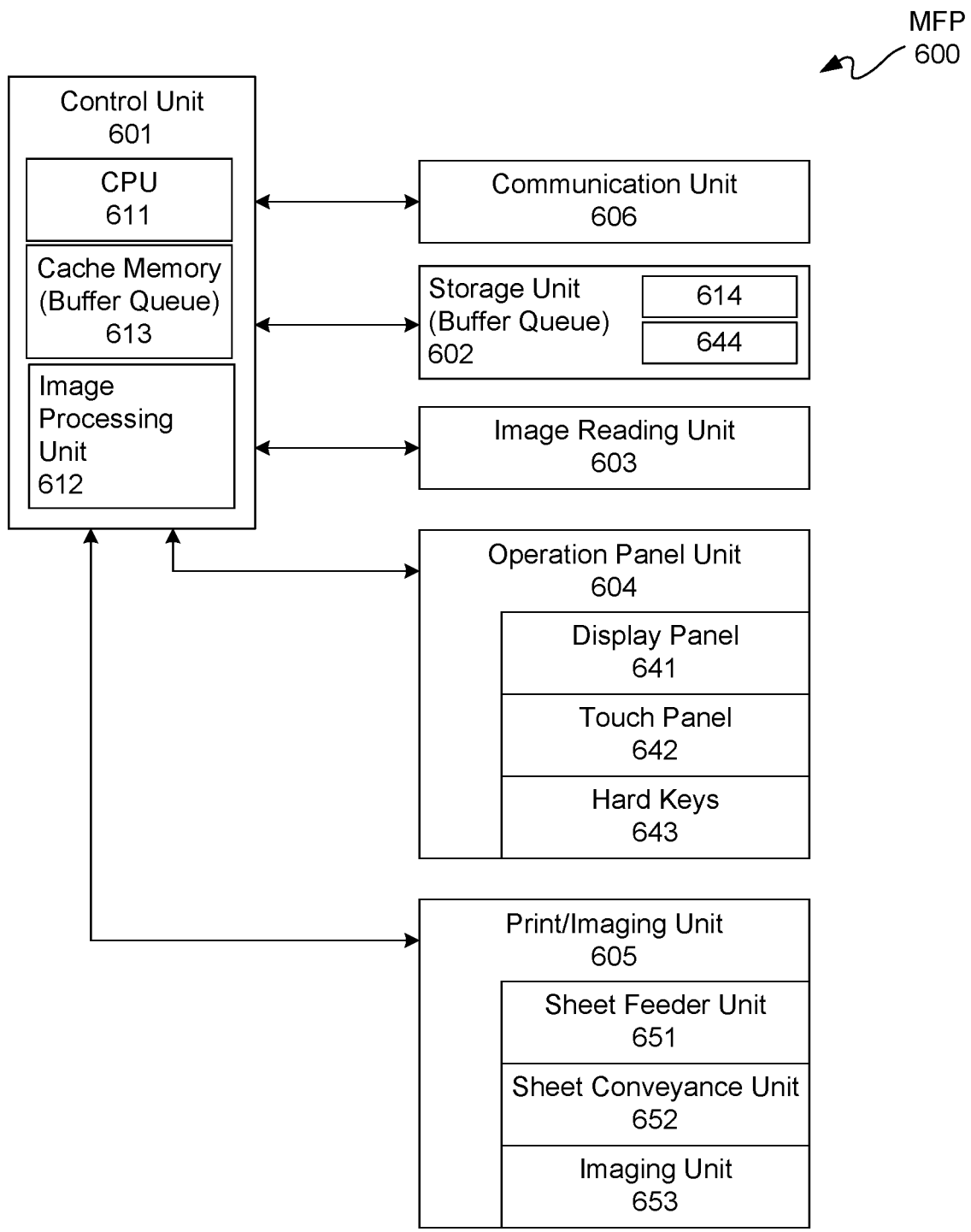
FIG. 6 is a block diagram depicting an example of a multi-function printer (MFP).

FIG. 6 is a block diagram depicting an example of a multi-function printer MFP 600. MFP 600 is provided for purposes of clarity by way of non-limiting example. MFP 600 is an example of an information processing system such as for handling a printer job.

MFP 600 includes a control unit 601, a storage unit 602, an image reading unit 603, an operation panel unit 604, a print/imaging unit 605, and a communication unit 606. Communication unit 606 may be coupled to a network for communication with other peripherals, mobile devices, computers, servers, and/or other electronic devices. Control unit 601 may include a CPU 611, an image processing unit 612, and cache memory 613.

Control unit 601 may be included with or separate from other components of MFP 600. Storage unit 602 may include ROM, RAM, and large capacity storage memory, such as for example an HDD or an SSD. Storage unit 602 may store various types of data and control programs, including without limitation a printer imaging pipeline program 614 and a printer job settings app 644. A buffer queue may be located in cache memory 613 or storage unit 602.

Operation panel unit 604 may include a display panel 641, a touch panel 642, and hard keys 643. Print/imaging unit 605 may include a sheet feeder unit 651, a sheet conveyance unit 652, and an imaging unit 653.

Generally, for example, for an MFP a copy image processing unit, a scanner image processing unit, and a printer image processing unit may all be coupled to respective direct memory access controllers for communication with a memory controller for communication with a memory. Many known details regarding MFP 600 are not described for purposes of clarity and not limitation.

Figure 7:
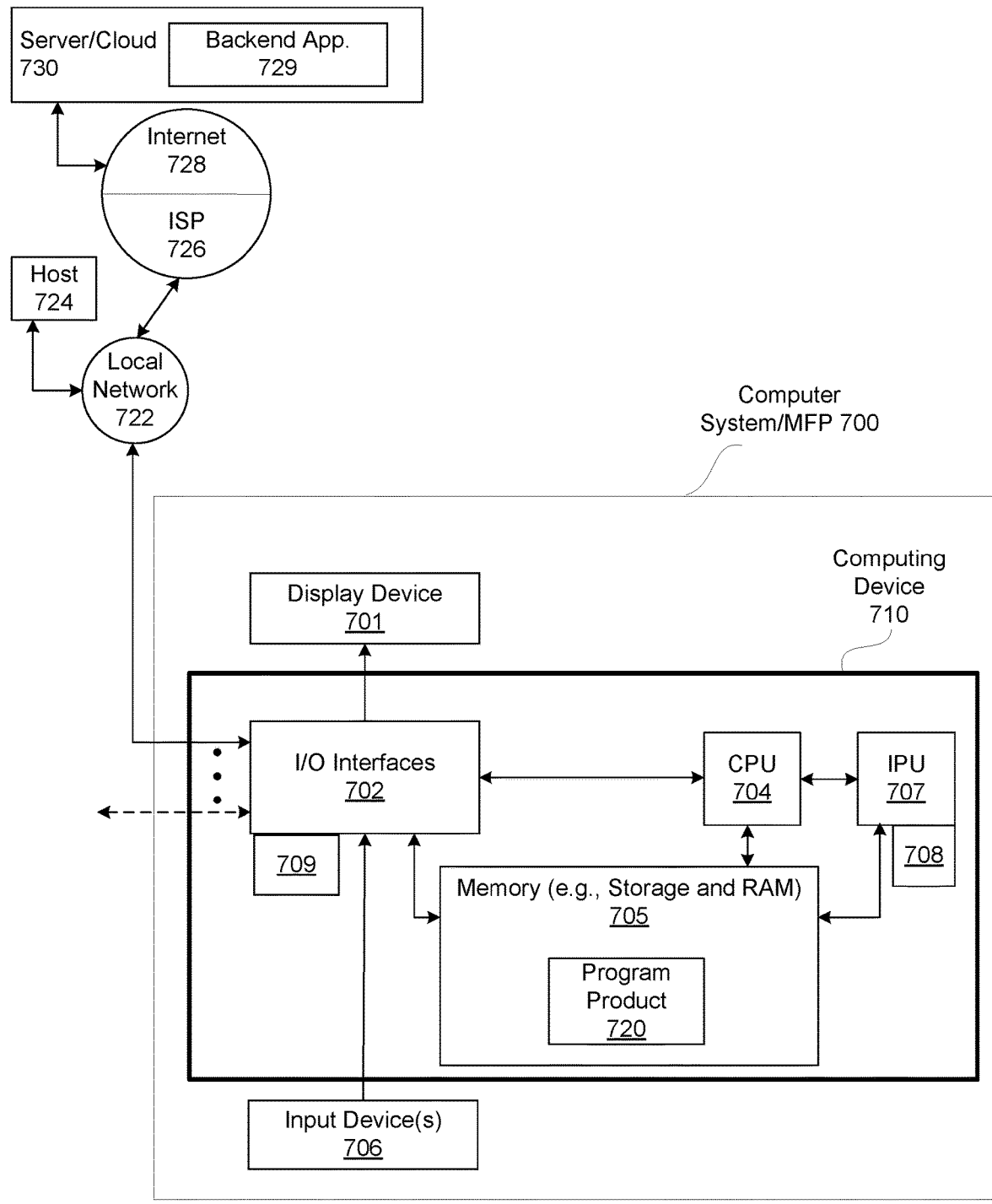
FIG. 7 is a block diagram depicting an example of a computer system.

FIG. 7 is a block diagram depicting an example of a computer system or MFP 700 ("computer system") upon which one or more aspects described herein may be implemented. Computer system 700 may include a programmed computing device 710 coupled to one or more display devices 701, such as Cathode Ray Tube ("CRT") displays, plasma displays, Liquid Crystal Displays ("LCDs"), Light Emitting Diode ("LED") displays, light emitting polymer displays ("LPDs") projectors and to one or more input devices 706, such as a keyboard and a cursor pointing device. Other known configurations of a computer system may be used. Computer system 700 by itself or networked with one or more other computer systems 700 may provide an information handling/processing system.

Programmed computing device 710 may be programmed with a suitable operating system, which may include Mac OS, Java Virtual Machine, Real-Time OS Linux, Solaris, iOS, Darwin, Android Linux-based OS, Linux, OS-X, UNIX, or a Windows operating system, among other platforms, including without limitation an embedded operating system, such as VxWorks. Programmed computing device 710 includes a central processing unit ("CPU") 704, one or more memories and/or storage devices ("memory") 705, and one or more input/output ("I/O") interfaces ("I/O interface") 702. Programmed computing device 710 may optionally include an image processing unit ("IPU") 707 coupled to CPU 704 and one or more peripheral cards 709 coupled to I/O interface 702. Along those lines, programmed computing device 710 may include graphics memory 708 coupled to optional IPU 707.

CPU 704 may be a type of microprocessor known in the art, such as available from IBM, Intel, ARM, and Advanced Micro Devices for example. CPU 704 may include one or more processing cores. Support circuits (not shown) may include busses, cache, power supplies, clock circuits, data registers, and the like.

Memory 705 may be directly coupled to CPU 704 or coupled through I/O interface 702. At least a portion of an operating system may be disposed in memory 705. Memory 705 may include one or more of the following: flash memory, random access memory, read only memory, magneto-resistive read/write memory, optical read/write memory, cache memory, magnetic read/write memory, and the like, as well as non-transitory signal-bearing media as described below. For example, memory 705 may include an SSD, which is coupled to I/O interface 702, such as through an NVMe-PCIe bus, SATA bus or other bus. Moreover, one or more SSDs may be used, such as for NVMe, RAID or other multiple drive storage for example.

I/O interface 702 may include chip set chips, graphics processors, and/or daughter cards, among other known circuits. In this example, I/O interface 702 may be a Platform Controller Hub ("PCH"). I/O interface 702 may be coupled to a conventional keyboard, network, mouse, camera, microphone, display printer, and interface circuitry adapted to receive and transmit data, such as data files and the like.

Programmed computing device 710 may optionally include one or more peripheral cards 709. An example of a daughter or peripheral card may include a network interface card ("NIC"), a display interface card, a modem card, and a Universal Serial Bus ("USB") interface card, among other known circuits. Optionally, one or more of these peripherals may be incorporated into a motherboard hosting CPU 704 and I/O interface 702. Along those lines, IPU 707 may be incorporated into CPU 704 and/or may be of a separate peripheral card.

Programmed computing device 710 may be coupled to a number of client computers, server computers, or any combination thereof via a conventional network infrastructure, such as a company's Intranet and/or the Internet, for example, allowing distributed use. Moreover, a storage device, such as an SSD for example, may be directly coupled to such a network as a network drive, without having to be directly internally or externally coupled to programmed computing device 710. However, for purposes of clarity and not limitation, it shall be assumed that an SSD is housed in programmed computing device 710.

Memory 705 may store all or portions of one or more programs or data, including variables or intermediate information during execution of instructions by CPU 704, to implement processes in accordance with one or more examples hereof to provide a program product 720. Program product 720 may be for implementing portions of process flows, as described herein. Additionally, those skilled in the art will appreciate that one or more examples hereof may be implemented in hardware, software, or a combination of hardware and software. Such implementations may include a number of processors or processor cores independently executing various programs, dedicated hardware and/or programmable hardware.

Along those lines, implementations related to use of computing device 710 for implementing techniques described herein may be performed by computing device 710 in response to CPU 704 executing one or more sequences of one or more instructions contained in main memory of memory 705. Such instructions may be read into such main memory from another machine-readable medium, such as a storage device of memory 705. Execution of the sequences of instructions contained in main memory may cause CPU 704 to perform one or more process steps described herein. In alternative implementations, hardwired circuitry may be used in place of or in combination with software instructions for such implementations. Thus, the example implementations described herein should not be considered limited to any specific combination of hardware circuitry and software, unless expressly stated herein otherwise.

One or more program(s) of program product 720, as well as documents thereof, may define functions of examples hereof and can be contained on a variety of non-transitory tangible signal-bearing media, such as computer- or machine-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or flash drive or hard-disk drive or read/writable CD or read/writable DVD).

Computer readable storage media encoded with program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. In implementations, information downloaded from the Internet and other networks may be used to provide program product 720. Such transitory tangible signal-bearing media, when carrying computer-readable instructions that direct functions hereof, represent implementations hereof.

Along those lines the term "tangible machine-readable medium" or "tangible computer-readable storage" or the like refers to any tangible medium that participates in providing data that causes a machine to operate in a specific manner. In an example implemented using computer system 700, tangible machine-readable media are involved, for example, in providing instructions to CPU 704 for execution as part of programmed product 720. Thus, a programmed computing device 710 may include programmed product 720 embodied in a tangible machine-readable medium. Such a medium may take many forms, including those describe above.

The term "transmission media", which includes coaxial cables, conductive wire and fiber optics, including traces or wires of a bus, may be used in communication of signals, including a carrier wave or any other transmission medium from which a computer can read. Transmission media can also take the form of acoustic or light waves, such as those generated during radio-wave and infra-red data communications.

Various forms of tangible signal-bearing machine-readable media may be involved in carrying one or more sequences of one or more instructions to CPU 704 for execution. For example, instructions may initially be carried on a magnetic disk or other storage media of a remote computer. The remote computer can load the instructions into its dynamic memory and send such instructions over a transmission media using a modem. A modem local to computer system 700 can receive such instructions on such transmission media and use an infra-red transmitter to convert such instructions to an infra-red signal. An infra-red detector can receive such instructions carried in such infra-red signal and appropriate circuitry can place such instructions on a bus of computing device 710 for writing into main memory, from which CPU 704 can retrieve and execute such instructions. Instructions received by main memory may optionally be stored on a storage device either before or after execution by CPU 704.

Computer system 700 may include a communication interface as part of I/O interface 702 coupled to a bus of computing device 710. Such a communication interface may provide a two-way data communication coupling to a network link connected to a local network 722. For example, such a communication interface may be a local area network ("LAN") card to provide a data communication connection to a compatible LAN. Wireless links may also be implemented. In any such implementation, a communication interface sends and receives electrical, electromagnetic or optical signals that carry digital and/or analog data and instructions in streams representing various types of information.

A network link to local network 722 may provide data communication through one or more networks to other data devices. For example, a network link may provide a connection through local network 722 to a host computer 724 or to data equipment operated by an Internet Service Provider ("ISP") 726 or another Internet service provider. ISP 726 may in turn provide data communication services through a world-wide packet data communication network, the "Internet" 728. Local network 722 and the Internet 728 may both use electrical, electromagnetic or optical signals that carry analog and/or digital data streams. Data carrying signals through various networks, which carry data to and from computer system 700, are exemplary forms of carrier waves for transporting information.

Wireless circuitry of I/O interface 702 may be used to send and receive information over a wireless link or network to one or more other devices' conventional circuitry such as an antenna system, an RF transceiver, one or more amplifiers, a tuner, one or more oscillators, a digital signal processor, a CODEC chipset, memory, and the like. In some implementations, wireless circuitry may be capable of establishing and maintaining communications with other devices using one or more communication protocols, including time division multiple access (TDMA), code division multiple access (CDMA), global system for mobile communications (GSM), Enhanced Data GSM Environment (EDGE), wide-band code division multiple access (W-CDMA), Long Term Evolution (LTE), LTE-Advanced, WIFI (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol. A computing device can include wireless circuitry that can communicate over several different types of wireless networks depending on the range required for the communication. For example, a short-range wireless transceiver (e.g., Bluetooth), a medium-range wireless transceiver (e.g., WIFI), and/or a long range wireless transceiver (e.g., GSM/GPRS, UMTS, CDMA2000, EV-DO, and LTE/LTE-Advanced) can be used depending on the type of communication or the range of the communication.

Computer system 700 can send messages and receive data, including program code, through network(s) via a network link and communication interface of I/O interface 702. In the Internet example, a server 730 might transmit a requested code for an application program through Internet 728, ISP 726, local network 722 and I/O interface 702. A server/Cloud-based system 730 may include a backend application for providing one or more applications or services as described herein. Received code may be executed by processor 704 as it is received, and/or stored in a storage device, or other non-volatile storage, of memory 705 for later execution. In this manner, computer system 700 may obtain application code in the form of a carrier wave.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A method for driverless printing by a user device, comprising:
   hiding time expired files in a hot folder accessible by a printer system;
   the hot folder configured to push a print job entry for the driverless printing by the printer system for the time expired files;
   the hiding including:
     renaming a data file of the time expired files in the hot folder from a first data file name to a second data file name different from the first data file name;
     marking the second data file name as processing in association with operation of the hot folder;
     mapping a relationship between the first data file name and the second data file name;

renaming a reference (xml) file in the hot folder from a first reference file name to a second reference file name different from the first reference file name;

marking the second reference file name as processing in association with operation of the hot folder; and mapping a relationship between the first reference file name and the second reference file name;

creating the print job entry in the printer system; and pushing the print job entry for the time expired files.

2. The method according to claim 1, wherein:

the hot folder is a network shared folder shared by the printer system; and the user device, in communication with the network shared folder to load a print job, does not include a printer driver for the driverless printing by the printer system.

3. The method according to claim 1, wherein:

the printer system includes a configuration application or a webpage to allow a user device to configure or add the hot folder; and the user device, in communication with the hot folder to load a print job, does not include a printer driver for the driverless printing.

4. The method according to claim 1, wherein the reference file includes default job settings for the driverless printing by the printer system.

5. The method according to claim 1, wherein the reference file includes user-selected job settings for the driverless printing by the printer system.

6. The method according to claim 1, wherein the hot folder is shared by the printer system and includes a defined expiration time for each of a plurality of file extensions.

7. The method according to claim 6, further comprising;

monitoring by the printer system the hot folder for addition of the data file; and starting a timer on the data file for the defined expiration time for an extension of the data file.

8. The method according to claim 7, further comprising analyzing the data file by the printer system during a waiting interval prior to reaching the defined expiration time for the data file.

9. The method according to claim 7, wherein the plurality of extensions include formats covering at least XJMF, XJDF, and PDF.

10. The method according to claim 7, wherein responsive to the data file and the reference file becoming the time expired files, the hiding is initiated.

11. The method according to claim 7, wherein the second data file name and the second reference file name are respective generated names by the printer system.

12. The method according to claim 1, wherein:

the data file is selected from a PDF file, a PS files, or a PCL file; and the reference file is an XJDF file.

13. The method according to claim 12, wherein the XJDF file is a default XJDF file resident in the hot folder, the method further comprising obtaining a default XJMF file to create the print job entry.

14. The method according to claim 12, wherein the XJDF file is generated by the printer system to provide job settings for the data file, the method further comprising obtaining a default XJMF file to create the print job entry referencing the XJDF file.

15. The method according to claim 12, wherein the XJDF file is generated with user-selected settings to provide job settings for the data file, the method further comprising obtaining an XJMF file referencing the XJDF file to create the print job entry.

16. The method according to claim 15, wherein the XJDF file is a first XJDF file, the method further comprising obtaining a second reference file as a second XJDF file, the second XJDF file being a default XJDF file resident in the hot folder to supplement the first XJDF file with default job settings for the print job entry.

17. The method according to claim 16, wherein the XJMF file is a default XJMF file generated by the printer system.

18. A system, comprising:

a printer system having:

a memory configured to store program code;

a processor coupled to the memory; and a printer engine configured for execution of printer operations;

wherein, in combination and response to executing the program code, the printer system is configured to initiate operations for implementing a process for driverless printing by a user device, the process including:

hiding time expired files in a hot folder accessible by the printer system;

the hot folder configured to push a print job entry for the driverless printing by the printer system for the time expired files;

the hiding including:

renaming a data file of the time expired files in the hot folder from a first data file name to a second data file name different from the first data file name;

marking the second data file name as processing in association with operation of the hot folder;

mapping a relationship between the first data file name and the second data file name;

renaming a reference file in the hot folder from a first reference file name to a second reference file name different from the first reference file name;

marking the second reference file name as processing in association with operation of the hot folder; and mapping a relationship between the first reference file name and the second reference file name; and creating the print job entry in the printer system; and pushing the print job entry for the time expired files.

19. The system according to claim 18, wherein:

the printer system includes a configuration application or a webpage to allow a user device to configure or add the hot folder;

the user device, in communication with the hot folder to load a print job, does not include a printer driver for the driverless printing;

the reference file is a default XJDF file resident in the hot folder; and the process further comprising obtaining a default XJMF file to create the print job entry.

20. The system according to claim 18, wherein:

the printer system includes a configuration application or a webpage to allow a user device to configure or add the hot folder;

the user device, in communication with the hot folder to load a print job, does not include a printer driver for the driverless printing;

the reference file is an XJDF file generated by the printer system to provide job settings for the data file; and the process further comprising obtaining a default XJMF file to create the print job entry referencing the XJDF file.

\* \* \* \* \*